US011060750B2

United States Patent
Kanamaru (10) Patent No.: US 11,060,750 B2
(45) Date of Patent: Jul. 13, 2021

(54) EQUIPMENT MANAGEMENT SYSTEM WITH EXTERNAL MANIPULATION TERMINAL

(71) Applicant: Mitsubishi Electric Corporation, Tokyo (JP)

(72) Inventor: Minoru Kanamaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 16/330,475

(22) PCT Filed: Sep. 16, 2016

(86) PCT No.: PCT/JP2016/077386
§ 371 (c)(1),
(2) Date: Mar. 5, 2019

(87) PCT Pub. No.: WO2018/051482
PCT Pub. Date: Mar. 22, 2018

(65) Prior Publication Data
US 2019/0203969 A1 Jul. 4, 2019

(51) Int. Cl.
*F24F 11/58* (2018.01)
*H04Q 9/00* (2006.01)
(Continued)

(52) U.S. Cl.
CPC ............. *F24F 11/58* (2018.01); *F24F 11/30* (2018.01); *F24F 11/63* (2018.01); *G08C 17/00* (2013.01);
(Continued)

(58) Field of Classification Search
CPC . F24F 11/30; F24F 11/58; F24F 11/63; G08C 17/00; G08C 2201/61; H04L 9/3226; H04Q 2209/40; H04Q 9/00
(Continued)

(56) References Cited

U.S. PATENT DOCUMENTS

2011/0228725 A1* 9/2011 Nakamoto .............. H04L 61/15
370/328
2016/0062332 A1* 3/2016 Call ......................... F24F 11/83
700/276
(Continued)

FOREIGN PATENT DOCUMENTS

JP 10-148381 A * 6/1998
JP 4514165 B2 7/2010
(Continued)

OTHER PUBLICATIONS

International Search Report of the International Searching Authority dated Oct. 18, 2016 for the corresponding International application No. PCI/JP2016/077386 (and English translation).
(Continued)

*Primary Examiner* — Chun Cao
(74) *Attorney, Agent, or Firm* — Posz Law Group, PLC (57) ABSTRACT

An equipment management system includes an equipment apparatus installed in a construction and configured to operate in accordance with details of manipulation, an equipment manipulation terminal including an equipment communication unit and configured to manipulate the equipment apparatus, and an external manipulation terminal including an external communication unit configured to communicate with the equipment manipulation terminal. The external manipulation terminal is configured to manipulate the equipment apparatus indirectly. When the equipment apparatus is manipulated by the external manipulation terminal, the external manipulation terminal transmits details of manipulation to the equipment manipulation terminal, and the equipment manipulation terminal manipulates the equipment apparatus in accordance with the details of manipulation received from the external manipulation terminal.

4 Claims, 5 Drawing Sheets (51) Int. Cl.
  *F24F 11/30* (2018.01)
  *G08C 17/00* (2006.01)
  *F24F 11/63* (2018.01)
  *H04L 9/32* (2006.01)
(52) U.S. Cl.
  CPC ............. *H04L 9/3226* (2013.01); *H04Q 9/00* (2013.01); *G08C 2201/61* (2013.01); *H04Q 2209/40* (2013.01)
(58) Field of Classification Search
  USPC ........................................................ 700/276
  See application file for complete search history.

(56) References Cited

U.S. PATENT DOCUMENTS

| | | | |
|---|---|---|---|
| 2016/0182704 A1* | 6/2016 | Minezawa | H04L 12/2818 455/420 |
| 2017/0244575 A1 | 8/2017 | Yamane | |
| 2019/0041080 A1* | 2/2019 | Higuchi | F24F 11/52 |

FOREIGN PATENT DOCUMENTS

| | | |
|---|---|---|
| JP | 2014-179820 A | 9/2014 |
| WO | 2014/175433 A1 | 10/2014 |
| WO | 2016/021208 A1 | 2/2016 |

OTHER PUBLICATIONS

Great Britain Examination Report dated May 25, 2021, issued in corresponding GB Patent Application No. 1901816.7.

* cited by examiner

EXAMPLE OF OPERATION STATUS DATA

| EQUIPMENT NUMBER, ACTIVATION-DEACTIVATION, OPERATION MODE, SET TEMPERATURE, ROOM TEMPERATURE, HUMIDITY, $CO_2$ CONCENTRATION |
|---|
| 001, OPERATION, COOLING, 27.0°C, 28.5°C, 65%, 320 ppm |
| 002, OPERATION, COOLING, 26.0°C, 26.4°C, 60%, 280 ppm |

FIG. 4

EXAMPLE OF HISTORY DATA (ABNORMALITY HISTORY)

| TIME OF OCCURRENCE, UNIT WHERE ABNORMALITY OCCURS, ABNORMALITY CODE, TIME OF RECOVERY |
|---|
| 2010/08/01 08:11, 01, 6601, 2010/08/01 08:25 |
| 2010/08/02 11:17, 01, 6607, 2010/08/02 11:21 |
| 2010/08/04 13:42, 02, 6603, 2010/08/04 14:12 |
| 2010/09/10 18:22, 01, 6607, 2010/09/10 18:45 |
| 2010/10/12 09:56, 02, 6601, 2010/10/12 10:05 |
| 2010/10/15 23:06, 01, 6608, 2010/10/15 23:31 |

EXAMPLE OF HISTORY DATA (TEMPERATURE TREND)

| TIME, ROOM TEMPERATURE, HUMIDITY |
|---|
| 08/01 00:00, 28.1, 45.0 |
| 08/01 00:01, 28.3, 46.0 |
| 08/01 00:02, 27.7, 45.0 |
| 08/01 00:03, 27.5, 46.0 |
| 08/01 00:04, 28.2, 47.0 |
| 08/01 00:05, 28.2, 46.0 |

FIG. 5

EXAMPLE OF REMOTE CONTROL SETTING
INFORMATION DATA (TIMER SETTINGS)

| ACTIVATION-DEACTIVATION TIMER, START TIME, END TIME, REPEAT |
|---|
| ENABLED, 8:30, 17:00, ENABLED |

EXAMPLE OF REMOTE CONTROL SETTING INFORMATION DATA
(REMOTE CONTROL DISPLAY SETTINGS)

| REMOTE CONTROL NAME, UNIT OF TEMPERATURE DISPLAY, ROOM TEMPERATURE DISPLAY, TIME DISPLAY FORMAT |
|---|
| CONFERENCE ROOM A, °C, ON, 12 h, AM 12:00 |

EXTERNAL MANAGEMENT TABLE

| MANIPULATION ITEM | EQUIPMENT MANIPULATION TERMINAL ID: 01 |
|---|---|
| USER MANIPULATION | 1 |
| SERVICE MANIPULATION | 0 |
| MANAGEMENT MANIPULATION | 0 |

1: MANIPULATION PERMITTED
0: MANIPULATION FORBIDDEN

FIG. 8

EQUIPMENT MANAGEMENT TABLE

| MANIPULATION ITEM | EXTERNAL MANIPULATION TERMINAL ID: A |
|---|---|
| USER MANIPULATION | 1 |
| SERVICE MANIPULATION | 0 |
| MANAGEMENT MANIPULATION | 0 |
| EXTERNAL MANIPULATION LOCKING | 0 |

1: MANIPULATION PERMITTED
0: MANIPULATION FORBIDDEN

EXTERNAL MANAGEMENT TABLE

| MANIPULATION ITEM | EQUIPMENT MANIPULATION TERMINAL ID: 01 | EQUIPMENT MANIPULATION TERMINAL ID: 02 | EQUIPMENT MANIPULATION TERMINAL ID: 02 |
|---|---|---|---|
| USER MANIPULATION | 1 | 1 | 1 |
| SERVICE MANIPULATION | 0 | 1 | 1 |
| MANAGEMENT MANIPULATION | 0 | 0 | 1 |

1: MANIPULATION PERMITTED
0: MANIPULATION FORBIDDEN

FIG. 12

EQUIPMENT MANAGEMENT TABLE

| MANIPULATION ITEM | EXTERNAL MANIPULATION TERMINAL ID: A | EXTERNAL MANIPULATION TERMINAL ID: B | EXTERNAL MANIPULATION TERMINAL ID: C |
|---|---|---|---|
| USER MANIPULATION | 1 | 1 | 1 |
| SERVICE MANIPULATION | 0 | 1 | 1 |
| MANAGEMENT MANIPULATION | 0 | 0 | 1 |
| EXTERNAL MANIPULATION LOCKING | 0 | 0 | 0 |

1: MANIPULATION PERMITTED
0: MANIPULATION FORBIDDEN

EQUIPMENT MANAGEMENT SYSTEM WITH EXTERNAL MANIPULATION TERMINAL

CROSS REFERENCE TO RELATED APPLICATION

This application is a U.S. national stage application of PCT/JP2016/077386 filed on Sep. 16, 2016, the contents of which are incorporated herein by reference.

TECHNICAL FIELD

The present invention relates to an equipment management system.

BACKGROUND ART

There has been provided a refrigerating and air-conditioning system including a refrigerating and air-conditioning apparatus in which an outdoor unit, an indoor unit, and a remote control with which operations can be manipulated and displayed are connected to each other via a communication line, and a customer management center capable of transmitting and receiving information via, for example, a wireless communication device provided in the refrigerating and air-conditioning apparatus (see, for example, Patent Literature 1).

In Patent Literature 1, a controller of the customer management center has a function of storing, when customer information is received from the refrigerating and air-conditioning apparatus, the customer information and product information of the refrigerating and air-conditioning apparatus in association with each other in a customer information database of the customer management center. That is, Patent Literature 1 proposes a technology for accessing the customer information database of the customer management center in response to manipulation on the remote control of the refrigerating and air-conditioning apparatus.

CITATION LIST

Patent Literature

Patent Literature 1: Japanese Patent No. 4514165

SUMMARY OF INVENTION

Technical Problem

In the related art as in Patent Literature 1, a user needs to manipulate an equipment apparatus such as the refrigerating and air-conditioning apparatus by using an equipment manipulation terminal such as the specific remote control connected to the equipment apparatus. Further, the equipment manipulation terminal to be used for manipulating the equipment apparatus is not accessible from the outside. A problem therefore arises in that information such as setting information held in the equipment manipulation terminal cannot be manipulated by using a terminal other than the equipment manipulation terminal.

The present invention has been made to solve the problem described above and therefore an object of the present invention is to provide an equipment management system in which usability can be improved.

Solution to Problem

An equipment management system according to an embodiment of the present invention includes an equipment apparatus installed in a construction and configured to operate in accordance with details of manipulation, an equipment manipulation terminal including an equipment communication unit and configured to manipulate the equipment apparatus, and an external manipulation terminal including an external communication unit configured to communicate with the equipment manipulation terminal. The external manipulation terminal is configured to manipulate the equipment apparatus indirectly. When the equipment apparatus is manipulated by the external manipulation terminal, the external manipulation terminal transmits details of manipulation to the equipment manipulation terminal, and the equipment manipulation terminal manipulates the equipment apparatus in accordance with the details of manipulation received from the external manipulation terminal.

Advantageous Effects of Invention

In the equipment management system according to an embodiment of the present invention, when the equipment apparatus is manipulated by the external manipulation terminal, the external manipulation terminal transmits the details of manipulation to the equipment manipulation terminal and the equipment manipulation terminal manipulates the equipment apparatus in accordance with the details of manipulation received from the external manipulation terminal. Thus, the equipment apparatus can be manipulated by the external manipulation terminal without manipulating the equipment apparatus by the equipment manipulation terminal such as a specific remote control.

Further, the equipment manipulation terminal that manipulates the equipment apparatus is accessible from the external manipulation terminal. It is therefore possible to manipulate information such as setting information held in the equipment manipulation terminal. Thus, the usability can be improved.

DESCRIPTION OF EMBODIMENTS

Embodiment of the present invention is described below with reference to the drawings. Note that the present invention is not limited to Embodiment described below. Further, in the drawings used below, the relationship of sizes of components may differ from an actual relationship.

Embodiment

Figure 1:
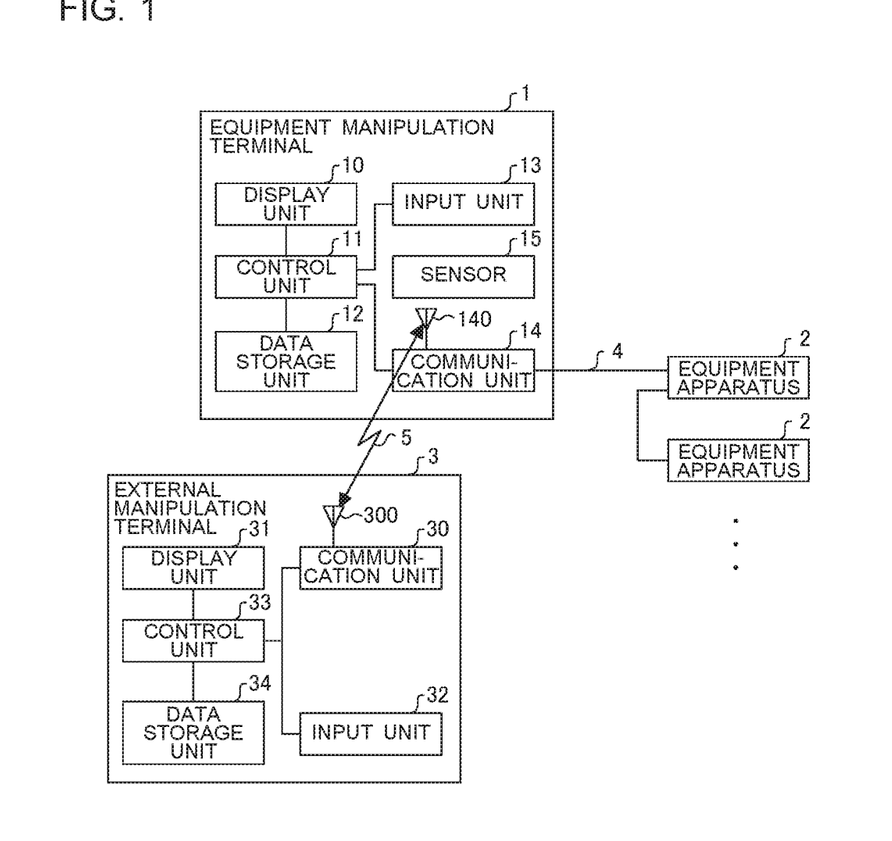
FIG. 1 is a diagram illustrating an example of the configuration of an equipment management system according to Embodiment of the present invention.

FIG. 1 is a diagram illustrating an example of the configuration of an equipment management system according to Embodiment of the present invention.

As illustrated in FIG. 1, the equipment management system according to Embodiment includes an equipment manipulation terminal 1, a plurality of equipment apparatuses 2, and an external manipulation terminal 3.

The equipment manipulation terminal 1 and the external manipulation terminal 3 are communicable with each other via a wireless communication unit 5. Details of manipulation of the external manipulation terminal 3 by a user are communicated via the wireless communication unit 5 and transmitted to the equipment manipulation terminal 1.

Note that, in Embodiment, there is employed the configuration in which the equipment manipulation terminal 1 and the external manipulation terminal 3 are communicable with each other via the wireless communication unit 5, but the configuration is not limited to this configuration. There may be employed a configuration in which the equipment manipulation terminal 1 and the external manipulation terminal 3 are communicable with each other via a wired communication unit (not illustrated).

Further, the equipment apparatus 2 and the equipment manipulation terminal 1 are communicable with each other via a wired communication unit 4 such as a dedicated communication line. Details of manipulation of the equipment manipulation terminal 1 by a user are communicated via the wired communication unit 4 and transmitted to the equipment apparatus 2. Further, the external manipulation terminal 3 and the equipment apparatus 2 are communicable with each other via the equipment manipulation terminal 1. Details of manipulation of the external manipulation terminal 3 by a user are transmitted to the equipment manipulation terminal 1 via the wireless communication unit 5 and then transmitted from the equipment manipulation terminal 1 to the equipment apparatus 2 via the wired communication unit 4.

The equipment apparatus 2 is an apparatus installed in a construction such as a building and a house and configured to operate in accordance with details of manipulation of the equipment manipulation terminal 1 or the external manipulation terminal 3. For example, the equipment apparatus 2 is an air-conditioning apparatus, an illumination apparatus, or a water heater. More specifically, a control unit (not illustrated) of the equipment apparatus 2 receives various commands such as a stopping command and a target temperature changing command from the equipment manipulation terminal 1 and controls an operation status of the equipment apparatus 2 in response to the received commands.

The equipment manipulation terminal 1 is a dedicated terminal to be used for performing various types of manipulation such as manipulation of an operation of the equipment apparatus 2 and communicates directly with the equipment apparatus 2. The equipment manipulation terminal 1 is manipulated by users such as a general user who uses basic functions of the equipment apparatus 2, a service engineer who maintains the equipment apparatus 2, and an administrator who manages the equipment apparatus 2.

The equipment manipulation terminal 1 includes a display unit 10, a control unit 11, a data storage unit 12, an input unit 13, a communication unit 14, and a sensor 15.

The display unit 10 is constituted of a liquid crystal display or other devices and displays a monitoring screen for operation statuses of the equipment apparatuses 2, a user manipulation screen, or other screens in accordance with control of the control unit 11.

The control unit 11 is constituted of a CPU (Central Processing Unit), a ROM (Read Only Memory), a RAM (Random Access Memory), and other devices and performs overall control over the equipment manipulation terminal 1. Further, the control unit 11 processes details of manipulation of the input unit 13 by a user, data detected by the sensor 15, the operation status of the equipment apparatus 2 that is received by the communication unit 14, or details of manipulation of the external manipulation terminal 3 by a user and reflects display contents onto the display unit 10 or reflects information onto various data tables of the data storage unit 12 described later.

Figure 2:
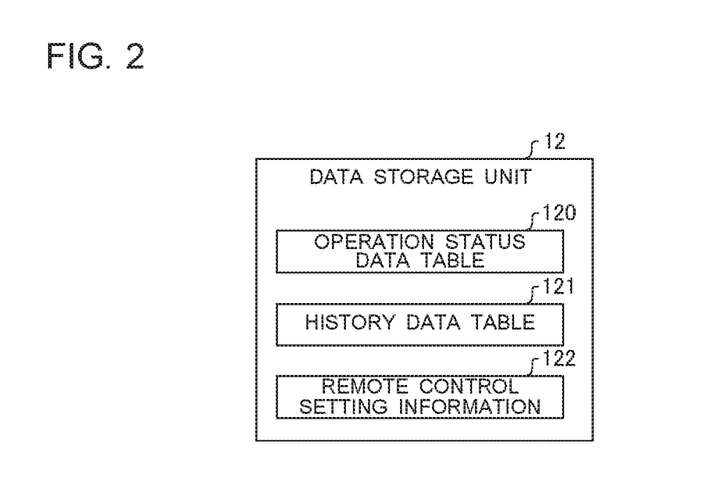
FIG. 2 is a block diagram illustrating the configuration of a data storage unit of FIG. 1.
Figure 3:
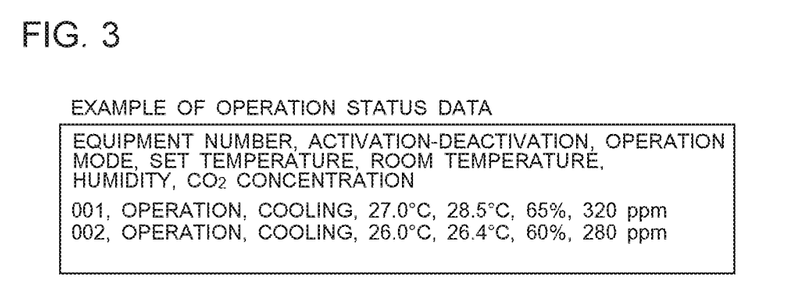
FIG. 3 is a diagram illustrating an example of an operation status data table of FIG. 2.
Figure 4:
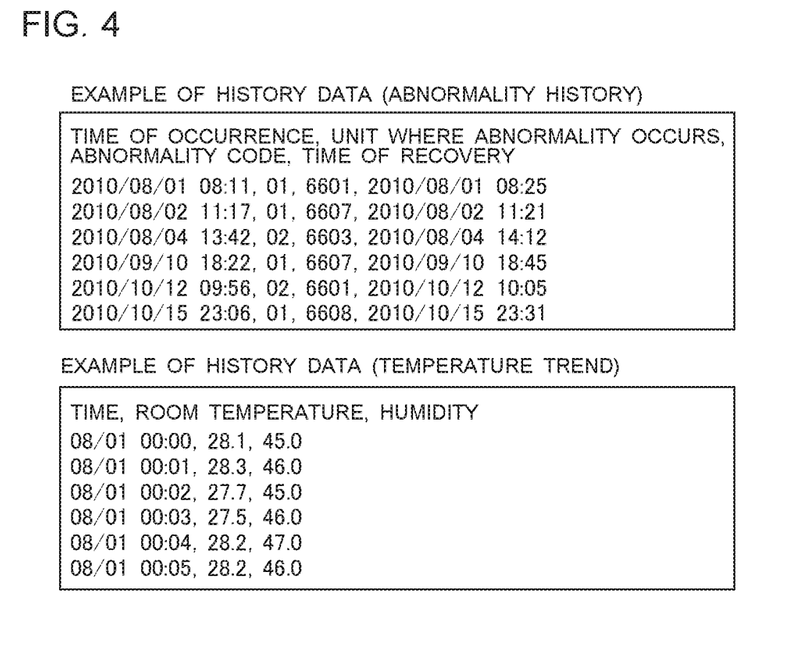
FIG. 4 is a diagram illustrating an example of a history data table of FIG. 2.
Figure 5:
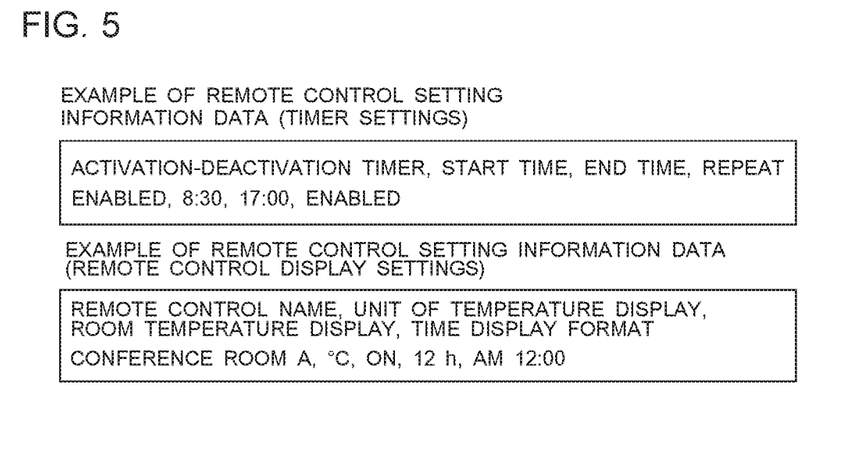
FIG. 5 is a diagram illustrating an example of remote control setting information of FIG. 2.

FIG. 2 is a block diagram illustrating the configuration of the data storage unit 12 of FIG. 1. FIG. 3 is a diagram illustrating an example of an operation status data table 120 of FIG. 2. FIG. 4 is a diagram illustrating an example of a history data table 121 of FIG. 2. FIG. 5 is a diagram illustrating an example of remote control setting information 122 of FIG. 2.

As illustrated in FIG. 2, the operation status data table 120, the history data table 121, and the remote control setting information 122 are stored in the data storage unit 12 as broad categories.

Note that all the users cannot manipulate various types of data stored in the data storage unit 12 and manipulation restrictions are provided by arbitrary passwords held in the equipment manipulation terminal 1. Further, a password is provided for each of manipulation items and a manipulation restriction is provided for each of manipulation items.

As illustrated in FIG. 3, various types of information that can be manipulated and monitored by the general user are stored in the operation status data table 120. More specifically, information related to current operation statuses of the equipment apparatuses 2 is stored. Examples of the information include a number assigned to each equipment apparatus 2, activation-deactivation information, an operation mode, setting information such as a set temperature, temperature information such as a room temperature and a temperature of each part in the apparatus, humidity information, and $CO_2$ concentration information.

As illustrated in FIG. 4, information to be viewed by a person who maintains the equipment management system, such as the service engineer, is stored in the history data table 121. More specifically, an operation history, a manipulation history, and an abnormality history of each equipment apparatus 2 and trend data obtained by extracting sensor detection values and other values at a predetermined time interval are stored.

As illustrated in FIG. 5, information to be defined and viewed by an equipment administrator of the equipment management system is stored as the remote control setting information 122. More specifically, scheduling and timer functions to be used for controlling the equipment apparatus 2 at arbitrary timings and display settings to be defined for setting a method for displaying information acquired from the equipment apparatus 2 are stored.

The input unit 13 is constituted of manipulation buttons, a touch panel, a mouse, a keyboard, and other devices provided on the equipment manipulation terminal 1 and performs processing of receiving a user's input action directly. For example, when the touch panel is employed, a transparent capacitance sensor having a flat-plate shape and configured to detect a change in capacitance is mounted on the display unit 10 in such a manner that the transparent capacitance sensor is overlaid on the display unit 10.

With the capacitance sensor, when a touch of a user's fingertip, a dedicated pen, or other objects, that is, a pressure is detected on a touch surface that is a display screen of the display unit 10 for the user, coordinate data that is information on the touch position is output to the control unit 11. Then, the control unit 11 makes determination on details of manipulation by a user on the basis of the coordinate data.

When the user such as the administrator performs an input action via the input unit 13 as described above, a signal corresponding to details of manipulation is output to the control unit 11. Note that manipulation targets are equivalent to the contents of various data tables written in the data storage unit 12 described above.

Although illustration is omitted, the communication unit 14 is constituted of a predetermined communication interface and performs communication of data via the wired communication unit 4, such as details of manipulation by the user and monitoring of the operation statuses of the equipment apparatuses 2, in accordance with control of the control unit 11. Further, the communication unit 14 includes an equipment communication unit 140 to have a function of transmitting and receiving data to and from the external manipulation terminal 3 via the wireless communication unit 5.

The sensor 15 is a sensor configured to measure a measurement target. Examples of the sensor 15 include a temperature sensor, a humidity sensor, a $CO_2$ sensor, an illuminance sensor, and a motion sensor.

The external manipulation terminal 3 is a general-purpose portable terminal such as a mobile phone and a smartphone and has a function of transmitting and receiving data to and from the equipment manipulation terminal 1 via the wireless communication unit 5 to manipulate the equipment apparatus 2 indirectly via the equipment manipulation terminal 1. Similarly to the equipment manipulation terminal 1, the external manipulation terminal 3 is manipulated by users such as a general user who uses basic functions of the equipment apparatus 2, a service engineer who maintains the equipment apparatus 2, and an administrator who manages the equipment apparatus 2.

As illustrated in FIG. 1, the external manipulation terminal 3 includes a communication unit 30, a display unit 31, an input unit 32, a control unit 33, and a data storage unit 34.

The communication unit 30 includes an external communication unit 300 to have a function of transmitting and receiving data to and from the equipment manipulation terminal 1 via the wireless communication unit 5. Note that the data to be transmitted and received is specifically setting data stored in the data storage unit 34 described later.

Examples of the wireless communication unit 5 associated with the equipment communication unit 140 of the communication unit 14 and the external communication unit 300 of the communication unit 30 include Wi-Fi (registered trademark), Bluetooth (registered trademark) including BLE, and band-specified low power radio.

The display unit 31 is constituted of a liquid crystal display or other devices and displays data received from the equipment manipulation terminal 1, a user manipulation screen, or other contents in accordance with control of the control unit 33.

The input unit 32 is constituted of manipulation buttons, a touch panel, and other devices provided on the external manipulation terminal 3 and performs processing of receiving a user's input action directly. For example, when the touch panel is employed, a transparent capacitance sensor having a flat-plate shape and configured to detect a change in capacitance is mounted on the display unit 31 in such a manner that the transparent capacitance sensor is overlaid on the display unit 31.

With the capacitance sensor, when a touch of a user's fingertip, a dedicated pen, or other objects, that is, a pressure is detected on a touch surface that is a display screen of the display unit 31 for the user, coordinate data that is information on the touch position is output to the control unit 33. Then, the control unit 33 makes determination on details of manipulation by a user on the basis of the coordinate data.

When the user such as the administrator performs an input action via the input unit 32 as described above, a signal corresponding to details of manipulation is output to the control unit 33. Note that manipulation targets are equivalent to the contents of various data tables written in the data storage unit 34 described below.

The control unit 33 is constituted of a CPU (Central Processing Unit), a ROM (Read Only Memory), a RAM (Random Access Memory), and other devices and performs overall control over the external manipulation terminal 3. Further, when the external manipulation terminal 3 is the smartphone, the control unit 33 executes an application program executable on the smartphone to transmit details of manipulation to the equipment manipulation terminal 1 in response to manipulation of the input unit 32 by a user or to process various types of information received from the equipment manipulation terminal 1 by the communication unit 30 and reflect display contents onto the display unit 31 or reflect information onto various data tables of the data storage unit 34 described later.

Similarly to the data storage unit 12 described above, the operation status data table 120, the history data table 121, and the remote control setting information 122 are stored in the data storage unit 34 as illustrated in FIG. 2. Further, a program for communication with the equipment manipulation terminal 1 and manipulation of the equipment apparatus 2 is stored in the data storage unit 34.

Further, when data stored in an external manipulation terminal 3 held by another user is transferred by using email and other tools, the data can be stored, managed or edited on the application program described above, or managed for each external manipulation terminal 3 in the data storage unit 34.

Figure 6:
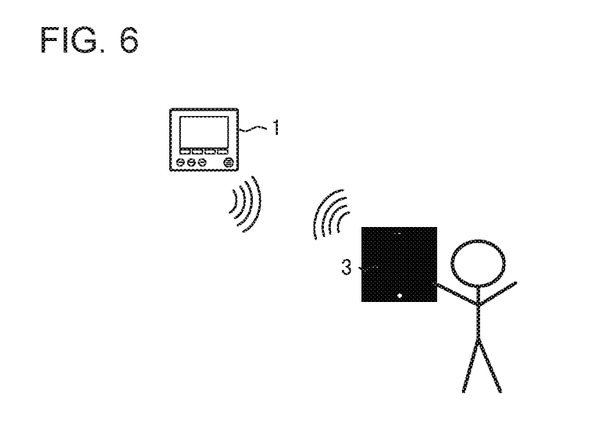
FIG. 6 is a diagram illustrating a case in which an equipment manipulation terminal and an external manipulation terminal that have a one-to-one relationship are used.

FIG. 6 is a diagram illustrating a case in which the equipment manipulation terminal 1 and the external manipulation terminal 3 that have a one-to-one relationship are used.

The case in which the equipment manipulation terminal 1 and the external manipulation terminal 3 that have a one-to-one relationship are used is considered as illustrated in FIG. 6. To manipulate the equipment apparatus 2 by the external manipulation terminal 3, it is first necessary to connect the external manipulation terminal 3 to the equipment manipulation terminal 1. In this case, passcode authentication is performed to connect the external manipulation terminal 3 and the equipment manipulation terminal 1 to each other. Consequently, the user inputs a passcode for connection to the external manipulation terminal 3 to transmit the passcode to the equipment manipulation terminal 1 together with a connection request.

When the connection request is received from the external manipulation terminal 3, the equipment manipulation terminal 1 determines whether the received passcode matches a passcode held in the equipment manipulation terminal 1.

When the received passcode matches the passcode held in the equipment manipulation terminal 1, the equipment manipulation terminal 1 transmits a connection permission response to the external manipulation terminal 3. When the connection permission response is received, the external manipulation terminal 3 then causes the display unit 31 to display the fact that the external manipulation terminal 3 is connected to the equipment manipulation terminal 1, thereby being capable of notifying the user of the external manipulation terminal 3 that the external manipulation terminal 3 is connected to the equipment manipulation terminal 1.

Similarly, the equipment manipulation terminal 1 causes the display unit 10 to display the fact that the equipment manipulation terminal 1 is connected to the external manipulation terminal 3, thereby being capable of notifying another user close to the equipment manipulation terminal 1 that the equipment manipulation terminal 1 is connected to the external manipulation terminal 3.

Note that, as a display method, it is conceivable that a connection completion dialog is displayed or an icon that represents wireless communication in progress is displayed.

Further, when the equipment apparatus 2 is manipulated by the external manipulation terminal 3, details of manipulation of the external manipulation terminal 3 are displayed on the display unit 10 of the equipment manipulation terminal 1 in addition to the display unit 31 of the external manipulation terminal 3. Consequently, it is possible to prevent another user from feeling unnecessary anxiety even when the details of manipulation of the external manipulation terminal 3 are automatically reflected to the equipment apparatus 2 although the other user does not manipulate the equipment manipulation terminal 1.

Further, when the equipment manipulation terminal 1 and the external manipulation terminal 3 are connected to each other, the user manipulates various types of data stored in the data storage unit 34 described above on the application executed on the external manipulation terminal 3, thereby being capable of transmitting the data to the equipment manipulation terminal 1.

In this case, as described above, manipulation restrictions are provided for various types of data stored in the data storage unit 12 of the equipment manipulation terminal 1 by arbitrary passwords held in the equipment manipulation terminal 1. Further, a password is provided for each of manipulation items and a manipulation restriction is provided for each of manipulation items.

It is therefore conceivable that the external manipulation terminal 3 is manipulated by the users such as the general user, the service engineer, and the administrator as described above but, when all the data in the data storage unit 34 can be manipulated by the external manipulation terminal 3, a variance may be caused with the manipulation restrictions provided by the passwords on the equipment manipulation terminal 1. As a result, the reliability of the equipment management system may be lost. Manipulation restrictions are therefore similarly provided on the external manipulation terminal 3 by arbitrary passwords. Further, a manipulation restriction is provided for each of manipulation items. Thus, consistency is given to restrictions between the equipment manipulation terminal 1 and the external manipulation terminal 3.

Note that, in Embodiment, the passcode authentication is performed to connect the external manipulation terminal 3 and the equipment manipulation terminal 1 to each other but password authentication may be performed. Further, the manipulation restrictions are provided on the equipment manipulation terminal 1 and the external manipulation terminal 3 through the password authentication but may be provided by passcode authentication.

The user inputs a user password, a service password, or an administrator password on the external manipulation terminal 3 to transmit the password to the equipment manipulation terminal 1 via the wireless communication unit 5. When the password is received from the external manipulation terminal 3, the equipment manipulation terminal 1 performs authentication on the password in comparison with an arbitrary password held in the equipment manipulation terminal 1. When the password input from the external manipulation terminal 3 matches the arbitrary password held in the equipment manipulation terminal 1, the equipment manipulation terminal 1 then permits manipulation of various types of data on the application of the external manipulation terminal 3.

Figure 7:
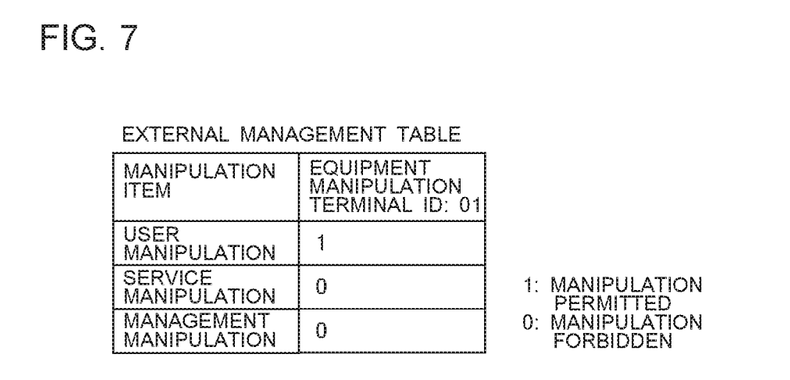
FIG. 7 is a diagram illustrating an example of a table for management of whether manipulation is permitted by the external manipulation terminal for each manipulation item.
Figure 8:
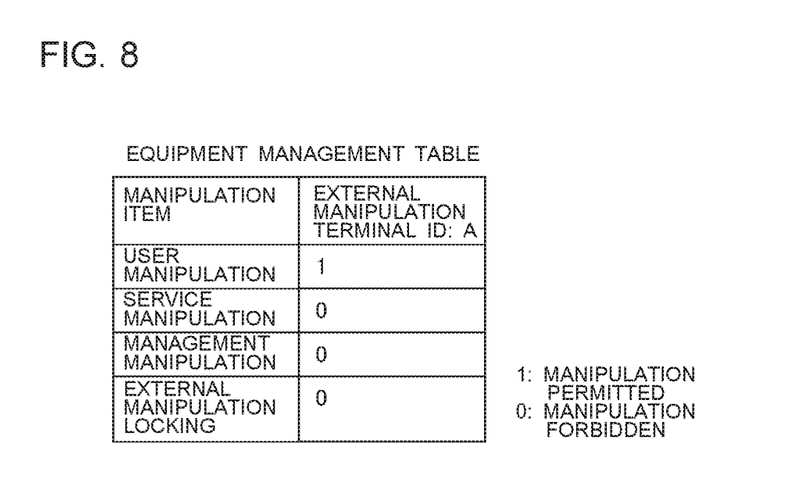
FIG. 8 is a diagram illustrating an example of a table for management of whether manipulation is permitted by the equipment manipulation terminal for each manipulation item.
Figure 9:
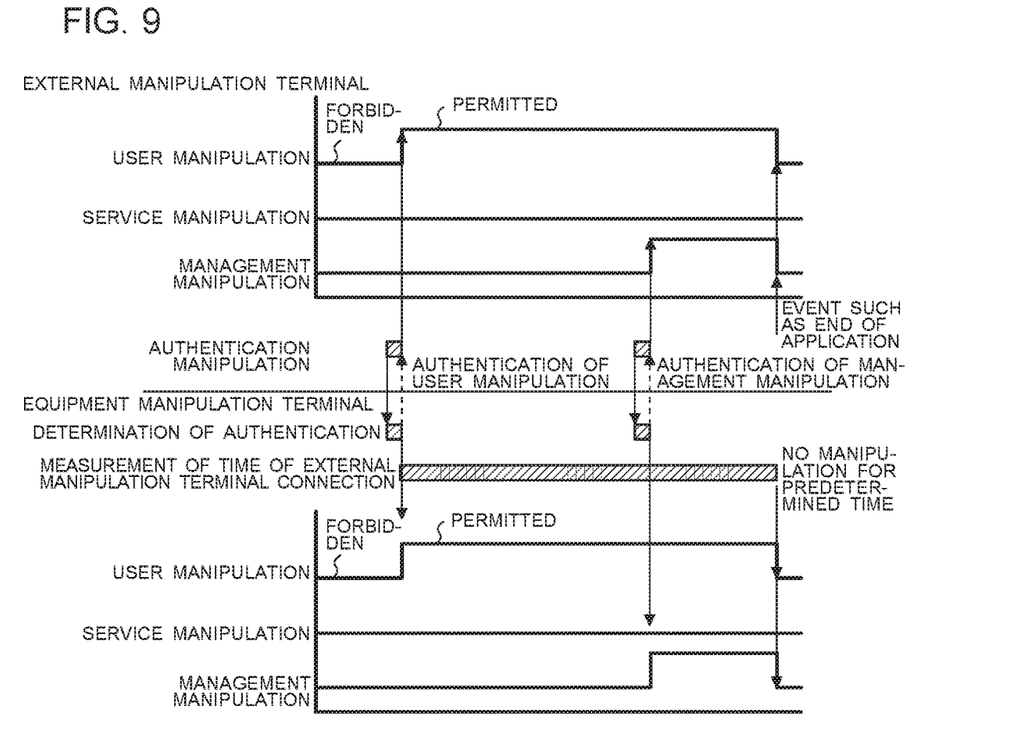
FIG. 9 is a diagram illustrating, in the form of a chart, whether manipulation is permitted by the external manipulation terminal and the equipment manipulation terminal for each manipulation item.

FIG. 7 is a diagram illustrating an example of a table for management of whether manipulation is permitted by the external manipulation terminal 3 for each manipulation item (hereinafter referred to as an external management table). FIG. 8 is a diagram illustrating an example of a table for management of whether manipulation is permitted by the equipment manipulation terminal 1 for each manipulation item (hereinafter referred to as an equipment management table). FIG. 9 is a diagram illustrating, in the form of a chart, whether manipulation is permitted by the external manipulation terminal 3 and the equipment manipulation terminal 1 for each manipulation item.

FIG. 7 and FIG. 9 illustrate the example of management of whether manipulation is permitted by the external manipulation terminal 3 for each manipulation item. Note that three manipulation items are defined as user manipulation, service manipulation, and management manipulation. Permission of manipulation is represented by 1 and forbiddance of manipulation is represented by 0.

When the password input from the external manipulation terminal 3 matches the user password held in the equipment manipulation terminal 1 through the password authentication, a user manipulation permission response is transmitted from the equipment manipulation terminal 1 to the external manipulation terminal 3. When the user manipulation permission response is received, the external manipulation terminal 3 then sets 1 to the item of the user manipulation in the external management table to permit manipulation of various types of data on the application of the external manipulation terminal 3.

Note that, in Embodiment, description is given of the case in which the password input from the external manipulation terminal 3 matches the user password stored in the equipment manipulation terminal 1. The same applies to the cases of the service password and the administrator password.

When the password input from the external manipulation terminal 3 does not match any passwords held in the equipment manipulation terminal 1, on the other hand, a manipulation forbiddance response is transmitted from the equipment manipulation terminal 1 to the external manipulation terminal 3. When the manipulation forbiddance response is received, the external manipulation terminal 3 then sets 0 to all the manipulation items in the external management table to avoid permitting manipulation of various types of data on the application of the external manipulation terminal 3. Thus, the external manipulation terminal 3 holds and manages the information on whether manipulation is permitted for each manipulation item.

FIG. 8 and FIG. 9 illustrate the example of management of whether manipulation is permitted by the equipment manipulation terminal 1 for each manipulation item.

Note that four manipulation items are defined as user manipulation, service manipulation, management manipulation, and external manipulation locking. Permission of manipulation is represented by 1 and forbiddance of manipulation is represented by 0.

The equipment manipulation terminal 1 similarly holds the information from the external manipulation terminal 3 on whether data manipulation is permitted.

When the password input from the external manipulation terminal 3 matches the user password held in the equipment manipulation terminal 1 through the password authentication, the equipment manipulation terminal 1 sets 1 in the equipment management table.

When the password input from the external manipulation terminal 3 does not match the passwords held in the equipment manipulation terminal 1, on the other hand, the equipment manipulation terminal 1 sets 0 in the equipment management table. Thus, the equipment manipulation terminal 1 also holds and manages the information on whether manipulation is permitted for each manipulation item.

Then, the security level can be improved by making the information held in the external manipulation terminal 3 on whether manipulation is permitted for each manipulation item and the information held in the equipment manipulation terminal 1 on whether manipulation is permitted for each manipulation item be identical.

Note that, in consideration of security regarding whether manipulation is permitted for each manipulation item, the time from establishment of connection between the equipment manipulation terminal 1 and the external manipulation terminal 3 is measured as illustrated in FIG. 9. When the equipment apparatus 2 is not manipulated by the external manipulation terminal 3 within a predetermined period, all the manipulation items may then be set to 0 to start the password authentication again.

Figure 10:
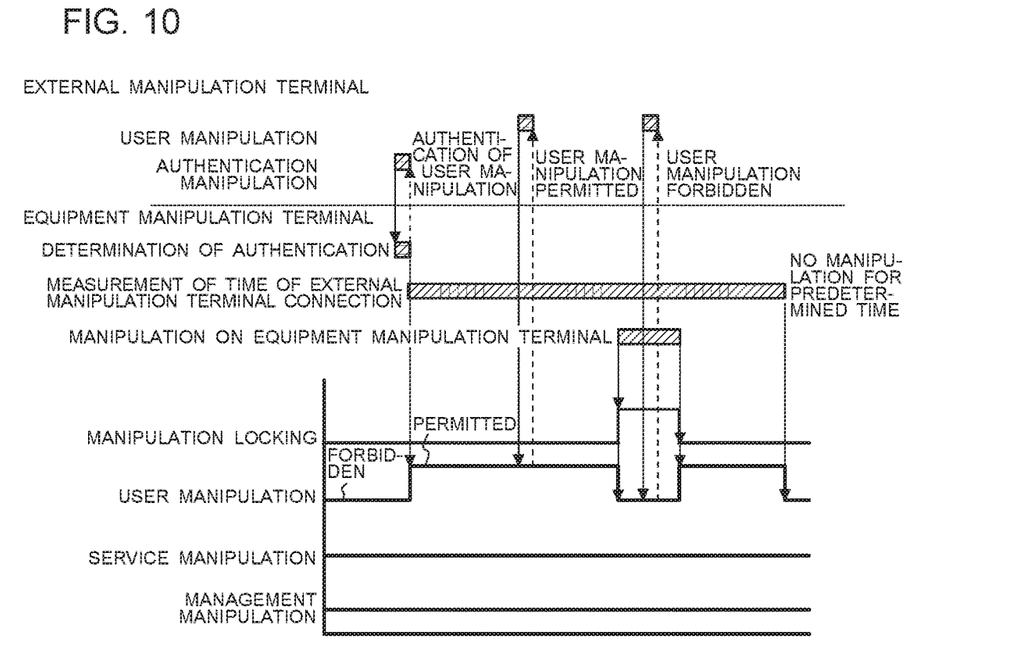
FIG. 10 is a diagram illustrating, in the form of a chart, an example of a method for managing whether manipulation is permitted for each manipulation item when the equipment apparatus is manipulated simultaneously by the equipment manipulation terminal and by the external manipulation terminal.

FIG. 10 is a diagram illustrating, in the form of a chart, an example of a method for managing whether manipulation is permitted for each manipulation item when the equipment apparatus 2 is manipulated simultaneously by the equipment manipulation terminal 1 and by the external manipulation terminal 3.

In this case, consideration is given to a case in which a user performs manipulation by the equipment manipulation terminal 1 and another user simultaneously performs manipulation by the external manipulation terminal 3 in the equipment management system in the case in which the equipment manipulation terminal 1 and the external manipulation terminal 3 have a one-to-one relationship as illustrated in FIG. 6. More specifically, when a user edits or saves the remote control setting information 122 on, for example, the scheduling or timer by the equipment manipulation terminal 1 and another user simultaneously performs similar manipulation by the external manipulation terminal 3 to update the setting data, it is conceivable that a variance of details of manipulation occurs between the equipment manipulation terminal 1 and the external manipulation terminal 3.

Priority levels are therefore set for the equipment manipulation terminal 1 and the external manipulation terminal 3. When the equipment apparatus 2 is manipulated simultaneously by the equipment manipulation terminal 1 and by the external manipulation terminal 3, priority is then given to the details of manipulation of the equipment manipulation terminal 1 over the details of manipulation of the external manipulation terminal 3, thereby being capable of preventing the variance of the setting data.

To give the priority to the details of manipulation of the equipment manipulation terminal 1, as illustrated in FIG. 10, the equipment manipulation terminal 1 sets 1 to the manipulation item of the external manipulation locking in the equipment management table while manipulation is being performed by the user. Thus, the equipment manipulation terminal 1 does not receive the manipulation by the external manipulation terminal 3 while 1 is set to the external manipulation locking. Consequently, the manipulation by the external manipulation terminal 3 can be forbidden.

Note that, while 1 is set to the external manipulation locking, the display unit 31 of the external manipulation terminal 3 may display the forbiddance of manipulation. Consequently, the user of the external manipulation terminal 3 can be notified of the forbiddance of manipulation.

Figure 11:
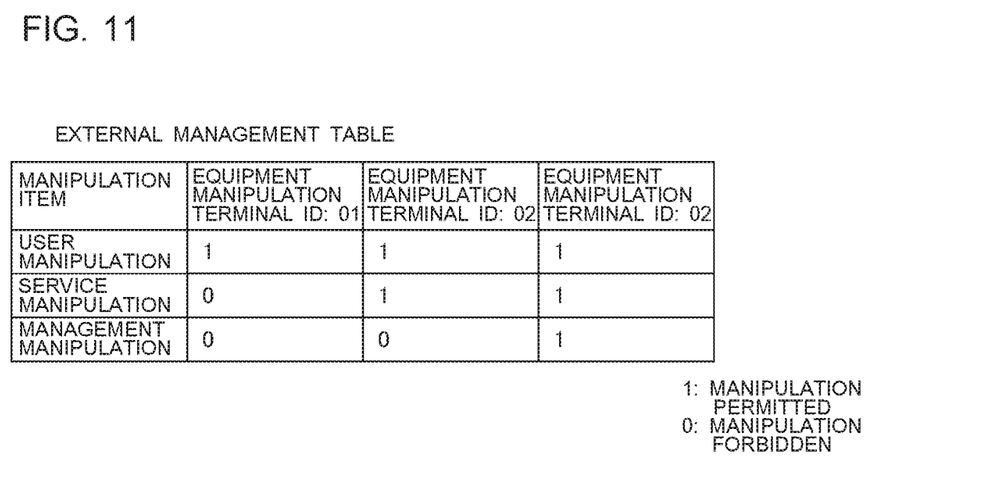
FIG. 11 is a diagram illustrating an example of a table for management of whether manipulation is permitted by an external manipulation terminal for each manipulation item when a plurality of equipment manipulation terminals are connected to the one external manipulation terminal.
Figure 12:
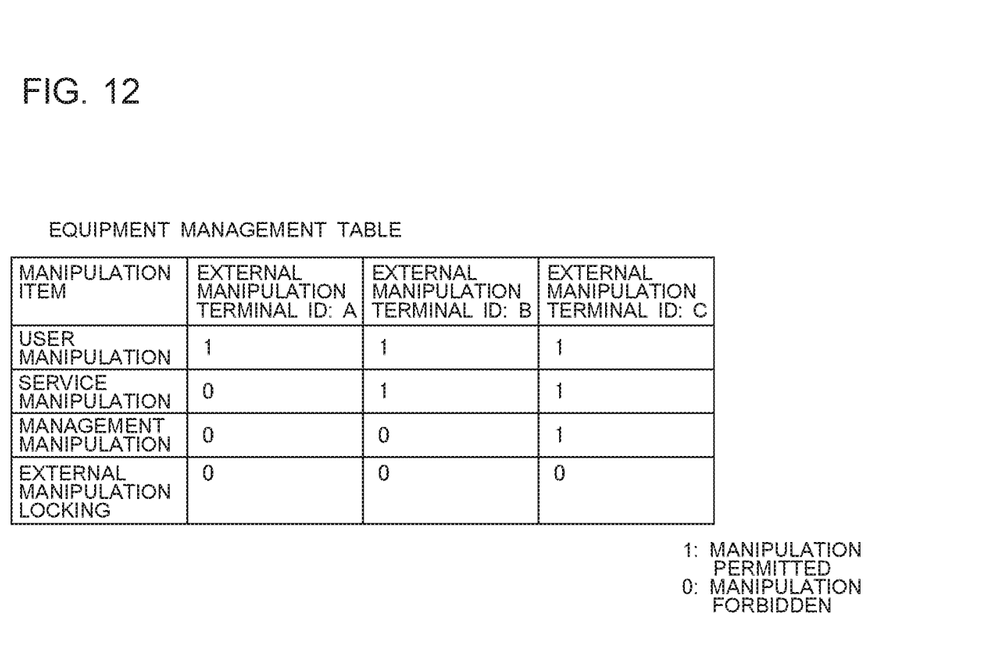
FIG. 12 is a diagram illustrating an example of a table for management of whether manipulation is permitted by an equipment manipulation terminal for each manipulation item when a plurality of external manipulation terminals are connected to the one equipment manipulation terminal.

FIG. 11 is a diagram illustrating an example of a table for management of whether manipulation is permitted by an external manipulation terminal 3 for each manipulation item when a plurality of equipment manipulation terminals 1 are connected to the one external manipulation terminal 3. FIG. 12 is a diagram illustrating an example of a table for management of whether manipulation is permitted by an equipment manipulation terminal 1 for each manipulation item when a plurality of external manipulation terminals 3 are connected to the one equipment manipulation terminal 1.

As illustrated in FIG. 11, when a plurality of equipment manipulation terminals 1 are connected to one external manipulation terminal 3, the number of fields in the external management table is increased so that the external manipulation terminal 3 and the equipment manipulation terminals 1 hold and manage information on whether manipulation is permitted by each equipment manipulation terminal 1 for each manipulation item.

Note that the plurality of equipment manipulation terminals 1 are identified on the basis of unique IDs each assigned to a corresponding one of the equipment manipulation terminals 1. More specifically, when the password input from the external manipulation terminal 3 matches the user password stored in the equipment manipulation terminal 1 through the password authentication performed on the equipment manipulation terminal 1, an ID is transmitted from the equipment manipulation terminal 1 to the external manipulation terminal 3 together with the user manipulation permission response.

When the ID is received together with the user manipulation permission response, the external manipulation terminal 3 then sets 1 to an item of user manipulation in the external management table for the equipment manipulation terminal 1 corresponding to the received ID to permit manipulation of various types of data on the application of the external manipulation terminal 3. Consequently, it is possible to secure reliability equivalent to that of the equipment management system in the case in which the equipment manipulation terminal 1 and the external manipulation terminal 3 have a one-to-one relationship.

Similarly, as illustrated in FIG. 12, when a plurality of external manipulation terminals 3 are connected to one equipment manipulation terminal 1, the number of fields in the equipment management table is increased so that the external manipulation terminals 3 and the equipment manipulation terminal 1 hold and manage information on whether manipulation is permitted by each external manipulation terminal 3 for each manipulation item.

Note that the plurality of external manipulation terminals 3 are identified on the basis of unique IDs each assigned to a corresponding one of the external manipulation terminals 3. More specifically, an ID is transmitted from the external manipulation terminal 3 to the equipment manipulation terminal 1 via the wireless communication unit 5 together with the password. When the ID is received from the external manipulation terminal 3 together with the password, the equipment manipulation terminal 1 performs authentication on the password in comparison with an arbitrary password stored in the equipment manipulation terminal 1 and identifies the external manipulation terminal 3 on the basis of an ID stored in the equipment manipulation terminal 1.

When the password input from the external manipulation terminal 3 matches the arbitrary password stored in the equipment manipulation terminal 1, manipulation of various types of data is then permitted on the application of the identified external manipulation terminal 3. Consequently, it is possible to secure reliability equivalent to that of the equipment management system in the case in which the equipment manipulation terminal 1 and the external manipulation terminal 3 have a one-to-one relationship.

As described above, in the equipment management system according to Embodiment, when the equipment apparatus 2 is manipulated by the external manipulation terminal 3, the external manipulation terminal 3 transmits details of manipulation to the equipment manipulation terminal 1 and the equipment manipulation terminal 1 manipulates the equipment apparatus 2 in accordance with the details of manipulation received from the external manipulation terminal 3. Thus, the equipment apparatus 2 can be manipulated by the external manipulation terminal 3 without manipulating the equipment apparatus 2 by the equipment manipulation terminal 1 such as a specific remote control.

Further, the equipment manipulation terminal 1 that communicates directly with the equipment apparatus 2 is accessible from the external manipulation terminal 3. It is therefore possible to manipulate the information such as the setting information held in the equipment manipulation terminal 1. Thus, the usability can be improved.

Further, the priority levels are set for the equipment manipulation terminal 1 and the external manipulation terminal 3. When the equipment apparatus 2 is manipulated simultaneously by the equipment manipulation terminal 1 and by the external manipulation terminal 3, priority is given to the details of manipulation of the equipment manipulation terminal 1 over the details of manipulation of the external manipulation terminal 3. That is, the equipment manipulation terminal 1 does not receive the manipulation by the external manipulation terminal 3 while the equipment manipulation terminal 1 is receiving the input action from the input unit 13. Consequently, the variance of the setting data can be prevented.

Further, when the external manipulation terminal 3 is connected to the equipment manipulation terminal 1, the display unit 31 of the external manipulation terminal 3 displays the fact that the external manipulation terminal 3 is connected to the equipment manipulation terminal 1 and the display unit 10 of the equipment manipulation terminal 1 also displays the fact that the equipment manipulation terminal 1 is connected to the external manipulation terminal 3. Consequently, the user of the external manipulation terminal 3 and another user close to the equipment manipulation terminal 1 can be notified that the external manipulation terminal 3 is connected to the equipment manipulation terminal 1.

Further, when the equipment apparatus 2 is manipulated by the external manipulation terminal 3, details of manipulation of the external manipulation terminal 3 are displayed on the display unit 10 of the equipment manipulation terminal 1 in addition to the display unit 31 of the external manipulation terminal 3. Consequently, it is possible to prevent another user from feeling unnecessary anxiety even when the details of manipulation of the external manipulation terminal 3 are automatically reflected to the equipment apparatus 2 although the other user does not manipulate the equipment manipulation terminal 1.

Further, when a manipulation restriction can be provided for each of manipulation items, the security level can be improved by causing the external manipulation terminal 3 and the equipment manipulation terminal 1 to hold information on whether manipulation is permitted for each manipulation item and by making the information held in the external manipulation terminal 3 on whether manipulation is permitted for each manipulation item and the information held in the equipment manipulation terminal 1 on whether manipulation is permitted for each manipulation item be identical.

Further, when a plurality of equipment manipulation terminals 1 are connected to one external manipulation terminal 3, the number of fields in the external management table is increased so that the external manipulation terminal 3 and the equipment manipulation terminals 1 hold and manage information on whether manipulation is permitted by each equipment manipulation terminal 1 for each manipulation item. Consequently, it is possible to secure reliability equivalent to that of the equipment management system in the case in which the equipment manipulation terminal 1 and the external manipulation terminal 3 have a one-to-one relationship.

Similarly, when a plurality of external manipulation terminals 3 are connected to one equipment manipulation terminal 1, the number of fields in the equipment management table is increased so that the external manipulation terminals 3 and the equipment manipulation terminal 1 hold and manage information on whether manipulation is permitted by each external manipulation terminal 3 for each manipulation item. Consequently, it is possible to secure reliability equivalent to that of the equipment management system in the case in which the equipment manipulation terminal 1 and the external manipulation terminal 3 have a one-to-one relationship.

REFERENCE SIGNS LIST 1 equipment manipulation terminal 2 equipment apparatus 3 external manipulation terminal 4 wired communication unit 5 wireless communication unit 10 display unit 11 control unit 12 data storage unit 13 input unit 14 communication unit 15 sensor 30 communication unit 31 display unit 32 input unit 33 control unit 34 data storage unit 120 operation status data table 121 history data table 122 remote control setting information 140 equipment communication unit 300 external communication unit

The invention claimed is:

1. A equipment management system, comprising:
an equipment apparatus installed in a construction and configured to operate in accordance with details of manipulation;
an equipment manipulation terminal including an equipment communication unit and an input unit and configured to manipulate the equipment apparatus; and
an external manipulation terminal including an external communication unit configured to communicate with the equipment manipulation terminal, the external manipulation terminal being configured to manipulate the equipment apparatus indirectly,
wherein when the equipment apparatus is manipulated by the external manipulation terminal,
the external manipulation terminal is configured to transmit details of manipulation to the equipment manipulation terminal, and
the equipment manipulation terminal is configured to manipulate the equipment apparatus in accordance with the details of manipulation received from the external manipulation terminal,
wherein the equipment management system is configured to provide a manipulation restriction for each manipulation item,
wherein each of the external manipulation terminal and the equipment manipulation terminal holds information on whether manipulation is permitted for each manipulation item, and
wherein the equipment management system is configured to make the information held in the external manipulation terminal on whether manipulation is permitted for each manipulation item and the information held in the equipment manipulation terminal on whether manipulation is permitted for each manipulation item identical.

2. The equipment management system of claim 1, wherein the equipment manipulation terminal comprises a plurality of equipment manipulation terminals and the external manipulation terminal and the plurality of equipment manipulation terminals hold information on whether manipulation is permitted by each of the plurality of equipment manipulation terminals for each manipulation item, or the external manipulation terminal comprises a plurality of external manipulation terminals and the plurality of external manipulation terminals and the equipment manipulation terminal hold information on whether manipulation is permitted by each of the plurality of external manipulation terminals for each manipulation item.

3. The equipment management system of claim 2, wherein, in a case in which the equipment manipulation terminal comprises the plurality of equipment manipulation terminals,
each of the plurality of equipment manipulation terminals has an ID that is unique,
each of the plurality of equipment manipulation terminals has a password for each manipulation item,
when a password is input, the external manipulation terminal transmits the password to each of the plurality of equipment manipulation terminals,
when the password is received from the external manipulation terminal, each of the plurality of equipment manipulation terminals performs authentication between the password for each manipulation item and the password received from the external manipulation terminal and, when the authentication is successful, a corresponding one of the plurality of equipment manipulation terminals transmits, to the external manipulation terminal, a signal indicating that manipulation is permitted in a manipulation item corresponding to the password for which the authentication is successful and the ID assigned to the corresponding one of the plurality of equipment manipulation terminals, and
when the signal and the ID are received from the corresponding one of the plurality of equipment manipulation terminals, the external manipulation terminal permits the manipulation in the manipulation item corresponding to the signal for the corresponding one of the plurality of equipment manipulation terminals corresponding to the ID.

4. The equipment management system of claim 2, wherein, in a case in which the external manipulation terminal comprises the plurality of external manipulation terminals,
each of the plurality of external manipulation terminals has an ID that is unique, the equipment manipulation terminal has a password for each manipulation item,
when a password is input, a corresponding one of the plurality of external manipulation terminals transmits, to the equipment manipulation terminal, the password and the ID assigned to the corresponding one of the plurality of external manipulation terminals, and
when the password and the ID are received from the corresponding one of the plurality of external manipulation terminals, the equipment manipulation terminal performs authentication between the password for each manipulation item and the password received from the corresponding one of the plurality of external manipulation terminals and, when the authentication is successful, the equipment manipulation terminal permits manipulation in a manipulation item corresponding to the password for which the authentication is successful for the corresponding one of the plurality of external manipulation terminals corresponding to the ID.

* * * * *